US010041441B2

(12) United States Patent
Boczek et al.

(10) Patent No.: US 10,041,441 B2
(45) Date of Patent: Aug. 7, 2018

(54) COOLING CHANNEL COVER AND PISTON PROVIDED WITH A COOLING CHANNEL COVER

(71) Applicant: Mahle International GmbH, Stuttgart (DE)

(72) Inventors: Sascha-Oliver Boczek, Dielheim (DE); Rainer Scharp, Vaihingen (DE); Timo Linke, Stuttgart (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 15/523,286

(22) PCT Filed: Oct. 27, 2015

(86) PCT No.: PCT/EP2015/074784
§ 371 (c)(1),
(2) Date: Apr. 28, 2017

(87) PCT Pub. No.: WO2016/066600
PCT Pub. Date: May 6, 2016

(65) Prior Publication Data

US 2017/0314505 A1 Nov. 2, 2017

(30) Foreign Application Priority Data

Oct. 30, 2014 (DE) ........................ 10 2014 015 947

(51) Int. Cl.
*F02F 3/22* (2006.01)
*F02F 1/00* (2006.01)
*F16J 1/04* (2006.01)

(52) U.S. Cl.
CPC ...................................... *F02F 3/22* (2013.01)

(58) Field of Classification Search
CPC .... F02F 3/22; F02F 3/225; F02F 3/045; F02F 3/08; F02F 3/12; F02F 3/16; F02F 3/20; F16J 1/005; F16J 1/08; F16J 1/09
(Continued)

(56) References Cited

U.S. PATENT DOCUMENTS 4,986,167 A 1/1991 Stratton et al.
5,546,896 A * 8/1996 Zaiser ................... F02F 3/0069
123/193.6
(Continued)

FOREIGN PATENT DOCUMENTS

DE 10346819 A1 4/2005
DE 102004019011 A1 11/2005
(Continued)

OTHER PUBLICATIONS

Japanese Notice of Allowance dated Oct. 3, 2017 in relation to corresponding Japanese Patent Application No. 2017-523493.
English abstract for DE-102009056922.

*Primary Examiner* — Thomas E Lazo
*Assistant Examiner* — Dustin T Nguyen
(74) *Attorney, Agent, or Firm* — Fishman Stewart PLLC

(57) ABSTRACT

An annular cooling channel cover for a piston may include an elastic material body having opposing end faces. At least two opposing end regions may provide a joint gap and at least one feed element for a coolant may be received in at least one opening disposed in the cooling channel cover. The feed element may include an inlet region and an outlet region, and may be held on the cooling channel cover via a clip-on latching connection. Spring clips may be disposed on the inlet region of the feed element, and/or latching elements may be disposed on the outlet region of the feed element. The spring clips may engage one of the end faces and the latching elements may engage the opposing end
(Continued)

face. A closure element may engage into the joint gap to close the same.

20 Claims, 4 Drawing Sheets

(58) Field of Classification Search
USPC ................. 92/186, 239, 159, 160, 190, 191; 123/41.35, 193.6, 41.01, 41.34, 193.5; 29/888.04, 888.045, 888.049
See application file for complete search history.

(56) References Cited

U.S. PATENT DOCUMENTS

| | | | | | |
|---|---|---|---|---|---|
| 6,401,595 | B1 * | 6/2002 | Bochart | F02F 3/00 | 92/186 |
| 6,647,861 | B1 * | 11/2003 | Jacobi | F02F 3/22 | 92/186 |
| 6,659,062 | B1 * | 12/2003 | Issler | F02F 3/22 | 123/193.6 |
| 6,722,263 | B2 | 4/2004 | Keller et al. | | |
| 6,820,582 | B1 * | 11/2004 | Gabriel | F02F 3/22 | 123/193.6 |
| 7,409,903 | B2 * | 8/2008 | Scharp | F02F 3/22 | 92/186 |
| 7,415,959 | B2 | 8/2008 | Scharp | | |
| 2002/0056367 | A1 * | 5/2002 | Bochart | B23P 15/10 | 92/239 |
| 2002/0178910 | A1 * | 12/2002 | Keller | F02F 3/22 | 92/208 |
| 2004/0250779 | A1 * | 12/2004 | Scharp | F02F 3/22 | 123/41.39 |
| 2005/0072386 | A1 * | 4/2005 | Gabriel | F02F 3/22 | 123/41.35 |
| 2005/0072387 | A1 * | 4/2005 | Gabriel | F02F 3/22 | 123/41.35 |
| 2005/0072394 | A1 * | 4/2005 | Gabriel | F02F 3/22 | 123/193.6 |
| 2005/0115523 | A1 * | 6/2005 | Bauer | F02F 3/22 | 123/41.35 |
| 2007/0209614 | A1 * | 9/2007 | Scharp | F02F 3/22 | 123/41.67 |
| 2008/0121204 | A1 * | 5/2008 | Scharp | F02F 3/0023 | 123/193.6 |
| 2009/0250033 | A1 * | 10/2009 | Scharp | F02F 3/22 | 123/193.6 |
| 2009/0288618 | A1 * | 11/2009 | Issler | F02F 3/0015 | 123/41.35 |
| 2013/0025550 | A1 * | 1/2013 | Ißler | F02F 3/22 | 123/41.35 |

FOREIGN PATENT DOCUMENTS

| | | | |
|---|---|---|---|
| DE | 102009056922 | A1 | 6/2011 |
| EP | 1199461 | A1 | 4/2002 |
| EP | 1238191 | A1 | 9/2002 |
| JP | H04500550 | A | 1/1992 |
| JP | 2003-517139 | A | 5/2003 |
| JP | 2009-270615 | A | 11/2009 |
| JP | 2011-094645 | A | 5/2011 |
| WO | WO-01/44645 | A1 | 6/2001 |

* cited by examiner

COOLING CHANNEL COVER AND PISTON PROVIDED WITH A COOLING CHANNEL COVER

CROSS-REFERENCE TO RELATED APPLICATIONS

This application claims priority to German Patent Application No. 10 2014 015 947.7, filed on Oct. 30, 2014, and International Patent Application No. PCT/EP2015/074784, filed on Oct. 27, 2015, the contents of which are hereby incorporated by reference in their entirety.

TECHNICAL FIELD

The present invention relates to an annular cooling channel cover for a piston of an internal combustion engine, which annular cooling channel cover is made from an elastic material and has two end faces which lie opposite one another, at least two end regions which lie opposite one another forming a joint gap, at least one feed element for cooling oil, which feed element has an inlet region and an outlet region, being received in an opening which is provided in the cooling channel cover and being held on the cooling channel cover by way of a clipped-in latching connection. Furthermore, the present invention relates to a piston which is provided with a cooling channel cover of this type.

BACKGROUND

A cooling channel cover of the generic type is known from EP 1 238 191 B1. Said known cooling channel cover has a feed element which is elastic per se, is received in an opening which is provided in the cooling channel cover, and is fastened thereto by means of a latching connection or by way of being clipped in. For mounting purposes, the known feed element is deformed elastically inward, in order for it to be possible to guide it through the opening in the cooling channel cover. This necessitates the known feed element being provided merely with very small solid latching lugs and bearing faces which have only very little contact with the cooling channel cover. Secure operation of a piston which is provided with a cooling channel cover of this type is not ensured reliably on account of the forces which occur on the latching lugs and bearing faces during engine operation and the associated wear in the region of the latching lugs and bearing faces.

Furthermore, the cooling channel cover of the generic type has at least one joint gap. A joint gap or joint gaps is/are necessary firstly, in order for it to be possible to compensate for the dimensional and positioning tolerances which occur here during the mounting of the part covers on the piston. Secondly, the at least one joint gap causes uncontrolled discharge of cooling oil from the cooling channel, as a result of which the cooling action of the cooling oil is reduced.

SUMMARY

The object of the present invention therefore consists in developing a cooling channel cover of the generic type in such a way that, in the case of simplified mounting on the piston, secure operation of a piston which is provided with said cooling channel cover is ensured, without the mass of the feed element and therefore the inertia forces which act during engine operation being increased excessively. Furthermore, uncontrolled discharge of cooling oil out of the cooling channel is to be avoided as completely as possible.

The solution consists in that at least one opening for receiving at least one feed element is provided in an end region which is arranged adjacently with respect to a joint gap, in that the at least one feed element has, on the inlet region, two spring clips which extend radially outward in the circumferential direction of the cooling channel cover and, on the outlet region, two latching elements which are elastic radially in the circumferential direction of the cooling channel cover, and in that the two latching elements bear against one end face and the two spring clips bear against the opposite end face of the cooling channel cover, in such a way that one spring clip covers the adjacent joint gap, and a closure element which is arranged on the spring clip engages into the joint gap and closes the latter.

Furthermore, the subject matter of the present invention is a piston for an internal combustion engine having a cooling channel cover of this type.

The spring tongues and latching elements which are provided according to the invention have the advantage that, with a low mass, they make greater surface contact possible between the feed element and the cooling channel cover than is the case in the prior art. Since in each case two spring clips and latching elements which lie radially opposite one another in the circumferential direction of the cooling channel cover are provided, the forces which act during engine operation act symmetrically on the feed element. Therefore, the wear during engine operation is reduced considerably in said region in comparison with the prior art. Furthermore, it is no longer necessary to configure the entire feed element to be elastic per se, which substantially increases the strength of the latching connection according to the invention. The at least one joint gap is closed reliably, with the result that uncontrolled discharge of cooling oil out of the cooling channel is avoided. The cooling channel cover according to the invention can be mounted simply on the piston, by first of all the cooling channel cover per se being inserted into the piston and subsequently the at least one feed element being fastened in the at least one opening which is provided for this purpose.

Advantageous developments arise from the subclaims.

The cooling channel cover can consist of two semicircular part covers in such a way that two joint gaps which lie diametrically opposite one another and two openings which lie diametrically opposite one another for receiving in each case one feed element are provided. A cooling channel cover of this type can be inserted into the piston in a particularly simple way.

One preferred development consists in that the latching elements bear with bearing faces and the spring clips bear with bearing faces against the end faces of the cooling channel cover, and in that the size of the bearing faces of the latching elements is from 30% to 60% of the size of the bearing faces of the spring clips. Said preferred development takes into consideration the fact that the acceleration of the piston according to the invention during engine operation is different at the top dead center and bottom dead center, since the maximum acceleration at the top dead center is approximately twice as great as the maximum acceleration at the bottom dead center. Therefore, the different size of the bearing faces of the latching element and the spring clip optimizes the wear behavior in said region.

The closure element preferably extends over the entire width of the spring clip and completely closes the joint gap which is assigned to it, in order to prevent uncontrolled discharge of cooling oil out of the cooling channel.

The inlet region of the feed element is expediently configured so as to be widened in a funnel-shaped manner, in order to optimize the entry of cooling oil which is injected by means of a cooling oil nozzle. The outlet region is preferably configured as a riser, with the result that the cooling oil which exits into the cooling channel is distributed in an optimum manner.

The feed element can have a passage opening with a round cross section. However, the cross section of the passage opening can also be configured so as to be greater in the circumferential direction of the cooling channel cover than in the radial direction of the cooling channel cover, in order to increase the intake capacity of the feed element for cooling oil.

The feed element can consist of a plastic and/or a metallic material, it being necessary for merely the at least one spring clip or the at least one latching element to be of elastic configuration.

The cooling channel cover can be manufactured, in particular, from a spring plate.

BRIEF DESCRIPTION OF THE DRAWINGS

Exemplary embodiments of the present invention will be described in greater detail in the following text using the appended drawings, in which, in a diagrammatic illustration which is not true to scale.

DETAILED DESCRIPTION

Figure 1:
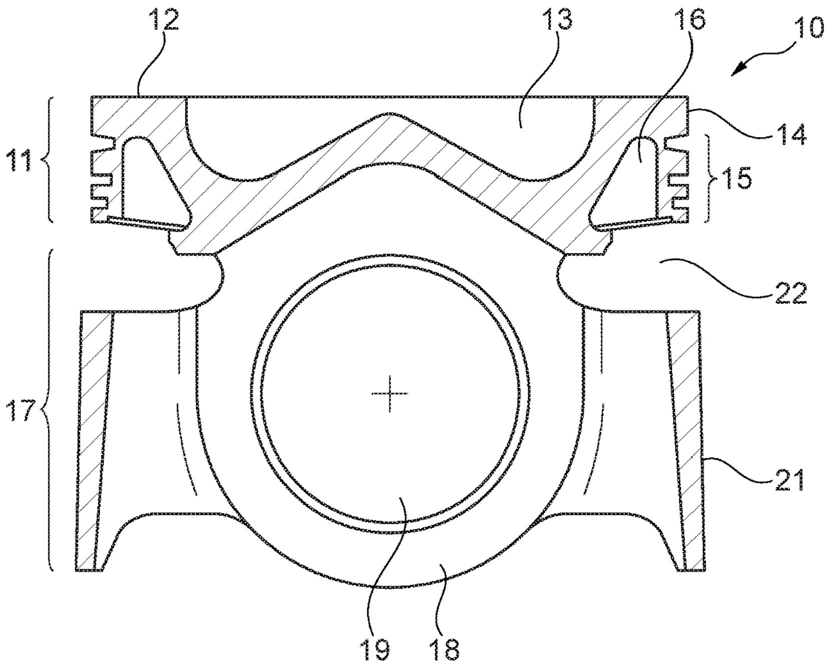
FIG. 1 shows one exemplary embodiment of a piston according to the invention in section, the feed element not being shown for reasons of clarity.

FIG. 1 shows a piston 10 by way of example. The piston 10 is configured as a box-type piston and has a piston head 11 with a piston crown 12, in which a combustion bowl 13 is made. Furthermore, the piston head 11 has a firing land 14 and a ring belt 15 with ring grooves for receiving piston rings (not shown). At the level of the ring belt 15, the piston is provided with a circumferential cooling channel 16 which is open toward the bottom and is closed by way of a cooling channel cover 30. Furthermore, in a manner known per se, the piston has a piston skirt 17 with piston bosses 18 which are provided with boss bores 19 for receiving a gudgeon pin (not shown). The piston bosses 18 are connected to one another in a manner which is known per se via running faces 21, the running faces 21 being decoupled thermally from the piston head 11 by means of recesses 22.

Figure 2:
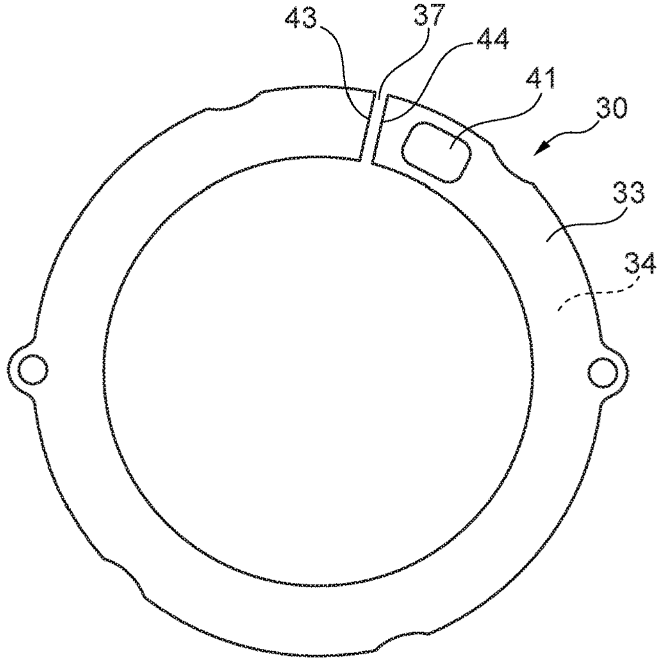
FIG. 2 shows a first exemplary embodiment of a cooling channel cover for a piston according to FIG. 1 in a plan view, the feed element not being shown for reasons of clarity.

FIG. 2 shows a first exemplary embodiment of an annular cooling channel cover 30 which is suitable for the present invention. The cooling channel cover 30 consists of an elastic material, of an elastic spring plate in the exemplary embodiment, and has in each case one end face 33, 34. Two end regions 43, 44 which lie opposite one another form a joint gap 37. An opening 41 for receiving a feed element 50 according to the invention is made in the cooling channel cover 30. The opening 41 is arranged adjacently with respect to the joint gap 37.

Figure 3:
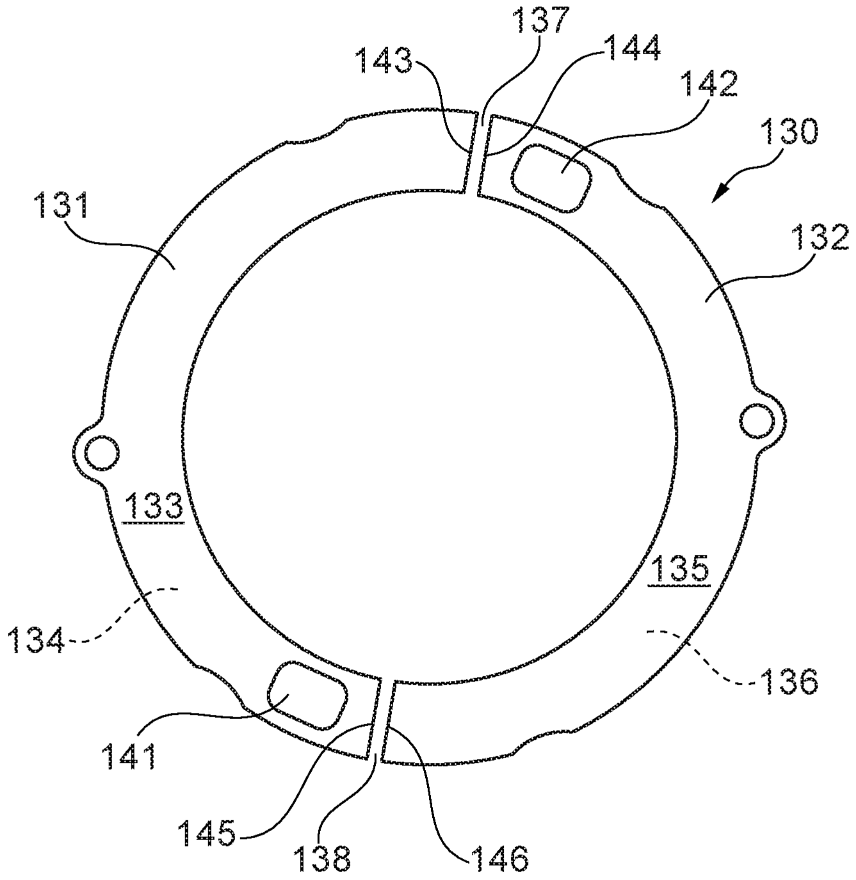
FIG. 3 shows a further exemplary embodiment of a cooling channel cover for a piston according to FIG. 1 in a plan view, the feed elements not being shown for reasons of clarity.
Figure 4:
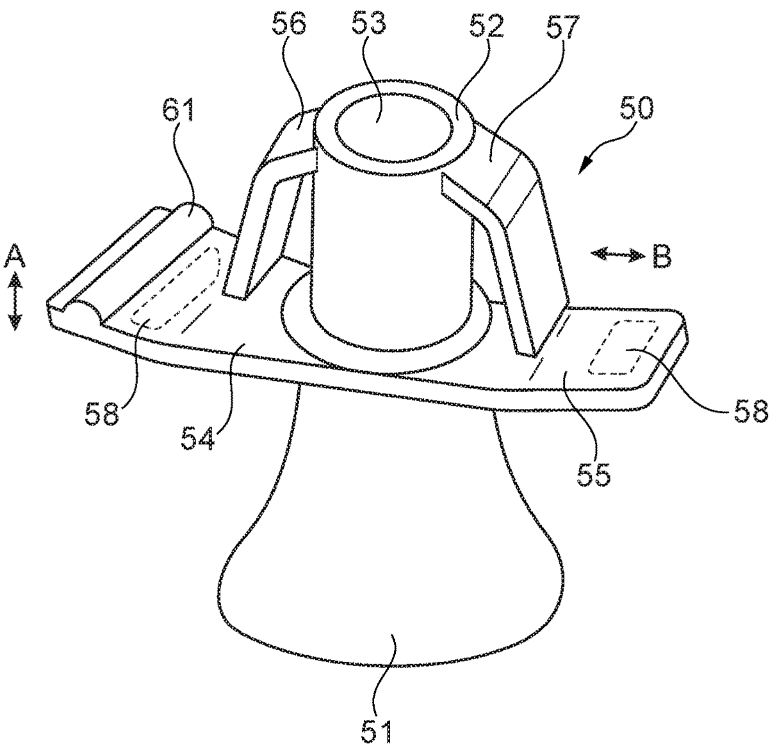
FIG. 4 shows one exemplary embodiment of a feed element according to the invention for a cooling channel cover according to FIGS. 2 and 3 in a perspective illustration.

FIG. 3 shows a further exemplary embodiment of a cooling channel cover 130 which is suitable for the present invention. The cooling channel cover 130 consists of two semicircular part covers 131, 132 which are manufactured from an elastic spring plate in the exemplary embodiment and have in each case two end faces 133, 134; 135, 136. In each case two end regions 143, 144; 145, 146, which lie opposite one another, of the part covers 131, 132 form a joint gap 137, 138. In each case one opening 141, 142 for receiving a feed element 50 according to the invention is made in each part cover 131, 132. Each opening 141, 142 is arranged adjacently with respect to a joint gap 138, 137.

Figure 7:
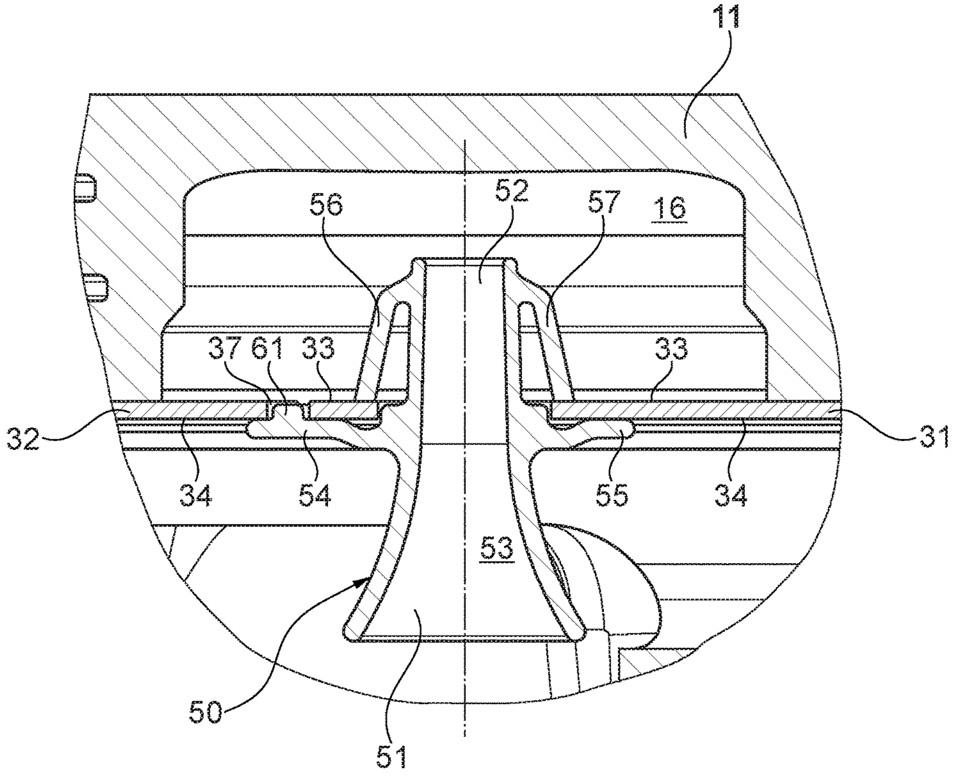
FIG. 7 shows the feed element according to FIG. 4 which is fastened to the cooling channel cover according to FIG. 2, in a piston according to FIG. 1, in the mounted state.

FIGS. 4 to 7 show one exemplary embodiment of a feed element 50 according to the invention as an individual part (FIGS. 3 to 6) and in the mounted state (FIG. 7). The feed element 50 has an inlet region 51 which protrudes out of the cooling channel 16 in the piston 10 in the mounted state (see FIG. 7). Furthermore, the feed element 50 has an outlet region 52 which opens into the cooling channel 16 in the piston 10 in the mounted state (see FIG. 7). A continuous passage opening 53 is provided in the feed element 50. The cross section of the passage opening 53 is as a rule circular. However, as indicated using dashed lines in FIG. 5, the cross section of the passage opening 53 can also be longer in the direction of the longitudinal axis of the spring clips 54, 55 than perpendicularly with respect to the longitudinal axis of the spring clips 54, 55. In the exemplary embodiment, the inlet region 51 of the feed element 50 is widened in a funnel-shaped manner toward its free end, whereas the outlet region 52 is configured as a riser.

Figure 5:
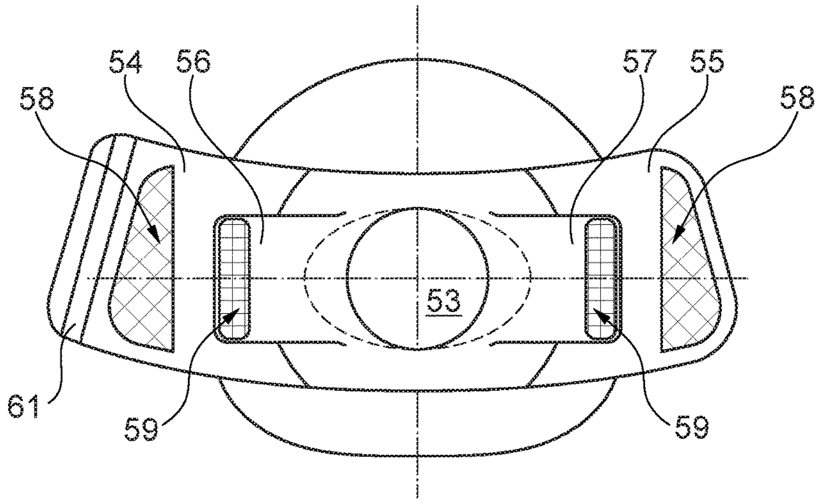
FIG. 5 shows an illustration of the bearing faces on the feed element according to FIG. 4.
Figure 6:
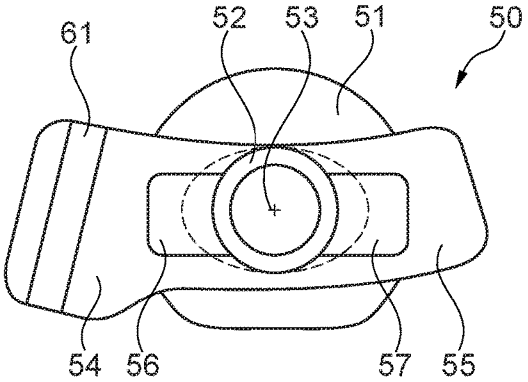
FIG. 6 shows an illustration of the feed element according to FIG. 4 in a plan view.

Two spring clips 54, 55 which lie opposite one another are arranged on the inlet region 51 in the vicinity of the outlet region 52, which spring clips 54, 55 are configured so as to be elastic in the direction of the arrows A and extend radially outward and, in the mounted state, in the circumferential direction of the cooling channel cover 30, 130 (see FIGS. 5 and 7). The spring clip 54 is of longer configuration in the circumferential direction of the cooling channel cover 30, 130 than the spring clip 55 and has a closure element 61 on its surface which faces the outlet region 52, which closure element 61 extends transversely with respect to the longitudinal axis of the spring clip 54 over its entire width in the exemplary embodiment. In the mounted state, the spring clip 54 covers the joint gap 37 or 137 or 138, the closure element 61 engaging into the joint gap 37 or 137 or 138 and closing the latter reliably (see FIG. 7).

Two latching elements 56, 57 which lie opposite one another and are elastic radially in the direction of the arrows B are provided at the upper end of the outlet region 52, which latching elements 56, 57 extend in the direction of the inlet region 51, and the free ends of which latching elements 56, 57 assume a defined spacing from the spring clips 54, 55, which spacing is dependent on the thickness of the cooling channel cover 30, 130. It can be seen from FIG. 5, in particular, that the spring clips 54, 55 have in each case one bearing face 58, and the latching elements 56, 57 have in each case one bearing face 59, by way of which bearing faces 58, 59 they bear against the end faces 33 or 34 and 133, 135 or 134, 136 of the cooling channel cover 30 or 130 in the mounted state (see FIG. 7). The size of each bearing face 59 of the latching elements 56, 57 is from approximately 30% to 60% of the size of each bearing face 58 of the spring clips 54, 55.

For mounting purposes, the cooling channel cover 30, 130 is first of all connected in a manner known per se to the piston 10, in order to close the cooling channel 16. In the exemplary embodiment, the openings 41 or 141 and 142 are generally arranged very closely on the outer wall of the piston bosses 18. This means that the spring clips 54, 55 protrude beyond the outer wall of the piston bosses 18 in the view from below. For mounting purposes, the feed element 50 is first of all moved axially past the outer wall of the piston bosses 18 in the direction of the piston crown. As soon as the spring clips 54, 55 come to lie on the side and above the outer wall of the piston bosses 18, a relative movement takes place in a plane parallel to the piston crown 12, until the feed element 50 is flush with the opening 41 or 141, 142 of the cooling channel cover 30, 130 and the spring clips 54, 55 are oriented in the circumferential direction of the cooling channel cover 30, 130, and such that in each case one spring clip 54 covers a joint gap 37 or 137, 138. Then, with compression of the latching elements 56, 57, the outlet region 52 of the feed element 50 is guided in the piston axial direction through the opening 41 or 141 and 142, until the spring clips 54, 55 bear against the end faces 34 or 134, 136 of the cooling channel cover 30, 130 and the closure elements 61 engage into the joint gaps 37 or 137 and 138. As soon as the latching elements 56, 57 have passed completely through the openings 41 or 141, 142, they snap back into their original position. The cooling channel cover 30, 130 is then arranged between the bearing faces 58 of the spring clips 54, 55 and the bearing faces 59 of the latching elements 56, 57. The feed element 50 is held fixedly on the cooling channel cover 30, 130 and is supported by way of its bearing faces 58, 59 on the cooling channel cover 30, 130 (see FIG. 7). The joint gaps 37 or 137, 138 are closed reliably, with the result that uncontrolled discharge of cooling oil is avoided.

The invention claimed is:

1. An annular cooling channel cover for a piston of an internal combustion engine, comprising:
- an elastic material annular body having at least two end faces disposed opposite one another, the annular body including at least two end regions disposed opposite one another defining a joint gap and at least one opening;
- at least one feed element for cooling fluid having an inlet region and an outlet region, the at least one feed element received in the at least one opening provided in the annular body and held on the the annular body via a clipped-in latching connection;
- a closure element;
- the at least one opening for receiving at least one feed element provided in at least one end region of the at least two end regions arranged adjacently with respect to the joint gap;
- the at least one feed element including at least two spring clips disposed on the inlet region extending radially outward in a circumferential direction of the annular body, and at least two latching elements disposed on the outlet region being elastic radially in the circumferential direction of the annular body;
- wherein the at least two latching elements bear against one end face of the at least two end faces and the at least two spring clips bear against the other end face of the at least two end faces, such that one spring clip of the at least two spring clips covers the joint gap; and
- wherein the closure element is arranged on the one spring clip and engages into the joint gap to close the joint gap.

2. The cooling channel cover as claimed in claim 1, wherein the annular body includes two semicircular part covers providing two joint gaps disposed diametrically opposite one another and two openings disposed diametrically opposite one another for respectively receiving one feed element.

3. The cooling channel cover as claimed in claim 1, wherein the at least two latching elements bear against the one end face with bearing faces and the at least two spring clips bear against the other end face with bearing faces, and wherein the bearing faces of the at least two latching elements have a size that is from 30% to 60% of a size of the bearing faces of the at least two spring clips.

4. The cooling channel cover as claimed in claim 1, wherein the closure element extends entirely over a width of the one spring clip and closes the joint gap completely.

5. The cooling channel cover as claimed in claim 1, wherein the inlet region of the at least one feed element is widened in a funnel-shaped manner.

6. The cooling channel cover as claimed in claim 1, wherein the outlet region of the at least one feed element is configured as a riser.

7. The cooling channel cover as claimed in claim 1, wherein the at least one feed element has a passage opening with a round cross section.

8. The cooling channel cover as claimed in claim 1, wherein the at least one feed element has a passage opening, the passage opening having a cross section that is greater in the circumferential direction than in a radial direction of the annular body.

9. The cooling channel cover as claimed in claim 1, wherein the at least one feed element includes at least one of a plastic material and a metallic material.

10. The cooling channel cover as claimed in claim 1, wherein the annular body is a spring plate.

11. A piston for an internal combustion engine, comprising:
- an annular cooling channel cover of an elastic material having a first end face and a second end face disposed axially opposite the first end face with respect to a piston reciprocating axis, the annular cooling channel cover including a joint gap defined between at least two end regions disposed opposite one another in a circumferential direction of the axis and at least one opening;
- at least one feed element for a coolant having an inlet region and an outlet region, the at least one feed element received in the at least one opening provided in the cooling channel cover and held on the cooling channel cover via a clipped-in latching connection;
- a closure element;
- the at least one opening for receiving at least one feed element disposed in at least one end region of the at least two end regions arranged adjacently with respect to the joint gap;
- the at least one feed element including at least two spring clips disposed on the inlet region extending radially outward in the circumferential direction of the axis, and at least two latching elements disposed on the outlet region that are elastic radially in the circumferential direction of the axis;
- wherein the at least two latching elements bear against the first end face and the at least two spring clips bear against the second end face such that a first spring clip of the at least two spring clips covers the joint gap; and wherein the closure element is arranged on the first spring clip and engages into the joint gap to close the joint gap.

12. The piston as claimed in claim 11, wherein the cooling channel cover includes another joint gap disposed diametrically opposite the joint gap, the at least one opening includes two openings disposed diametrically opposite one another, and the at least one feed element includes two feed elements, and wherein the two feed elements are respectively received in the two openings.

13. The piston as claimed in claim 11, wherein the inlet region of the at least one feed element includes a funnel-shaped structure.

14. The piston as claimed in claim 11, wherein the at least one feed element has a tubular shape.

15. The piston as claimed in claim 14, wherein the at least one feed element defines a passage opening with a round cross section.

16. The piston as claimed in claim 14, wherein the at least one feed element defines a passage opening having a cross section that is greater in the circumferential direction than in a radial direction of the axis.

17. The piston as claimed in claim 11, further comprising an annular cooling channel, wherein the cooling channel cover closes the cooling channel.

18. The piston as claimed in claim 17, wherein the outlet region of the at least one feed element extends into the cooling channel.

19. The piston as claimed in claim 11, wherein the at least one feed element includes at least one of an elastic material and a metallic material.

20. An annular cooling channel cover for a piston of an internal combustion engine, comprising:

an annular body of an elastic material having a first end face and a second end face disposed axially opposite the first end face with respect to a piston reciprocating axis, the annular body including a joint gap defined between at least two end regions disposed opposite one another in a circumferential direction of the axis and at least one opening disposed in at least one end region of the at least two end regions adjacent to the joint gap;

at least one feed element for a coolant having an inlet region and an outlet region, the at least one feed element received in the at least one opening and held on the annular body via a clipped-in latching connection;

a closure element;

at least two spring clips disposed on the inlet region of the at least one feed element and extending radially outward in the circumferential direction of the axis;

at least two latching elements disposed on the outlet region of the at least one feed element and structured elastic radially in the circumferential direction of the axis;

wherein the at least two latching elements have bearing faces that bear against the first end face and the at least two spring clips having bearing faces that bear against the second end face such that a first spring clip of the at least two spring clips covers the joint gap; and wherein the closure element is arranged on the first spring clip and engages into the joint gap to close the joint gap.

* * * * *